US005734652A

United States Patent [19]
Kwok

[11] Patent Number: 5,734,652
[45] Date of Patent: Mar. 31, 1998

[54] ATM EXTENDED AUTOREGISTRATION AND VPI/VCI ASSIGNMENT IN A HYBRID FIBER-COAX CABLE NETWORK

[75] Inventor: Timothy C. Kwok, Kirkland, Wash.

[73] Assignee: Microsoft Corporation, Redmond, Wash.

[21] Appl. No.: 535,770

[22] Filed: Sep. 27, 1995

[51] Int. Cl.⁶ ............................................. H04L 12/56
[52] U.S. Cl. ................................... 370/395; 370/397
[58] Field of Search ........................... 370/60, 60.1, 61,
370/94.1, 94.2, 85.6, 85.13, 94.3, 252,
241, 389, 392, 395, 396, 397, 398, 399,
400, 428, 468, 474, 444; 340/825.5, 825.51,
825.52, 825.03; 348/6, 7, 10, 13, 12, 16

[56] References Cited

U.S. PATENT DOCUMENTS

| | | | |
|---|---|---|---|
| 5,539,884 | 7/1996 | Robrock | 370/399 |
| 5,548,587 | 8/1996 | Bailey et al. | 370/94.2 |
| 5,548,588 | 8/1996 | Ganmukhi et al. | 370/94.1 |

*Primary Examiner*—Dang Ton
*Attorney, Agent, or Firm*—Lee & Hayes, PLLC

[57] ABSTRACT

Described herein is an ATM cable network having a plurality of ATM subscriber interface units or set-top boxes (STBs) in individual neighborhood homes. A coax distribution plant provides a plurality of communication channels between the STBs and the a neighborhood node. A cable headend serves the neighborhood node and its associated STBs through a fiber-optic trunk providing a plurality of different communication channels or frequencies. The headend includes an ATM node switch having switch ports associated with each of the different communication channels. An access resource manager at the headend assigns individual STBs to respective communications channels. STBs share both upstream and downstream communications channels and switch ports. In an extended autoregistration procedure, the ATM node switch is configured to assign exclusive ranges of virtual channel numbers to the individual STBs tuned to the single switch port. During ATM cell transfer, an ATM cell originating from or destined to a specific STB uses a virtual channel number within a range of virtual channel numbers assigned to the STB. This allows the headend to determine the source of all upstream data cells an allows STBs to disregard any cells not intended for them.

36 Claims, 4 Drawing Sheets

ATM EXTENDED AUTOREGISTRATION AND VPI/VCI ASSIGNMENT IN A HYBRID FIBER-COAX CABLE NETWORK

TECHNICAL FIELD

This invention relates to public switched broadband cable distribution systems which use ATM (asynchronous transfer mode) for information transfer.

BACKGROUND OF THE INVENTION

FIG. 1 shows a traditional broadcast CATV (cable television) system, generally designated by the reference numeral 10. CATV system 10 includes a headend 12 which is responsible for broadcasting analog video to all subscribers connected to the system. A headend might support from a few hundred homes in a rural area to hundreds of thousands of homes in a metropolitan area. Headend 12 is connected to multiple neighborhood nodes 14 by trunk lines 16. Traditional trunk lines include microwave links and coaxial cables, often associated with repeaters 17. Each neighborhood node serves the homes of a limited neighborhood area. In many traditional systems, however, neighborhood nodes might each serve several thousand homes.

From the neighborhood nodes, connections to homes are made through coaxial plants 18. A coaxial plant comprises multiple active coaxial feeders 19, each tapped by multiple passive coaxial drop cables that reach individual subscribers.

CATV system 10 is a one-way delivered system based on passband transmission. s United States, the passband system consists of a set of downstream 6 MHz channels between 50 and 450 MHz. The 5 MHz through 42 MHz spectrum is reserved for upstream traffic. Many systems do not utilize the upstream frequencies.

In recent years, fiber-optic cable has been deployed very aggressively to replace traditional minks between headends and neighborhood nodes. Opto-electronic conversion equipment is provided at the neighborhood node to make use of the coaxial cable plant extending to the individual homes. Fiber cabling increases reliability, reduces noise problems, and decreases maintenance costs. This type of distribution system is referred to as having a "hybrid fiber/coax" (HFC) architecture.

In conjunction with the conversion to fiber hunks, the number of homes supported by each neighborhood node has dropped to between 500 and 2000 homes. This is much smaller than the number of homes supported as little as 10 years ago.

Public HFC networks are being deployed not only by CATV companies, but also by telephone companies. Some HFC networks deployed by telephone companies and CATV operators are switched systems designed to support both broadcast video and switched broadband digital communication services. Switched systems such as this typically support much fewer homes per neighborhood node than traditional systems. They also provide additional downstream channels for interactive services. Such additional channels are typically in the 450 MHz to 750 MHz range, and could extend up to 1 GHz in the future. For example, a plant to be installed by Tele-Communications, Inc., of Denver Colo., will use channels in the 50–750 MHz spectrum. While analog broadcast channels will initially occupy the spectrum from 50 MHz to 450 MHz, reallocations will probably be made as interactive channels and services become available.

Newer, switched systems provide two-way communications using a back-channel which typically operates in the range of 5 MHz to 42 MHz. In addition, switched systems are capable of providing independent information services to individual subscribers. For instance, each home can choose its own information stream, such as a selected video or motion picture, independent of other homes and independent of broadcast schedules.

Some switched public networks use asynchronous transfer mode (ATM) cell transmission. This technology uses data cells with a fixed length of 53 bytes to reduce network latency and allow better statistical multiplexing of information on a given medium than available when using larger packets of variable length. The fixed length of the cells also simplifies switching them into and out of data media operating at different data rates, and allows scalable network performance.

FIG. 2 shows an ATM cell 21. The cell contains a 5-byte header 22 and a 48-byte information field or payload 24. For switching or routing purposes, only the header is significant. At a user network interface (UNI) of an ATM network, the first four bits of the first byte of the header contain a generic flow control field, designated GFC. It is used to control the flow of traffic into a network. The next 24 bits (the last half of byte one, bytes two and three, and the first half of byte four) make up the what is referred to as a virtual channel number or ID. The virtual channel number is made up two subfields: a virtual path identifier VPI and a virtual channel identifier VCI. The VPI is formed by the first byte of the virtual channel number. The VCI is formed by the second and third bytes. The next three bits, designated PT for payload type, indicate the type of information carried by the cell. The last bit of the header's byte four, CLP, indicates the cell loss priority as set by a user. This bit indicates the eligibility of the cell for discard by the network under congested conditions. The last byte of the header, HEC, is the header error control field. This is an 8-bit CRC that can be used for both error detection and correction. It is calculated across the previous four bytes of the header. The HEC does not provide error checking or correction for the payload. If such checking or connection is desired, it must be performed at a higher network level.

ATM networking depends on the establishment of virtual connections. An ATM virtual connection is a series of links between physical devices in a network. ATM uses virtual channels (VCs) and virtual paths (VPs) for routing cells through such physical devices. A virtual channel is a connection between two communicating ATM entities. It may consist of a concatenation of several ATM links. All communications between two end points proceed along a one or more virtual channels. Each virtual channel preserves cell sequence and is guaranteed to provide a specified data rate. A virtual path is a group of virtual channels. Virtual paths provide a convenient way of bundling traffic all heading in the same destination. VP-switching equipment (in what is referred to as a cross-connect system) only needs to check the VPI portion of the cell header to route the cell rather than the entire three-byte address. For instance, a single VPI might be used to indicate a path between two related offices. The VCIs would be used only within the offices to determine destinations within the offices.

In traveling from one end-point to another, a cell usually passes through one or more ATM node switches. A switch has a plurality of physical communication ports for communication with other switches or with individual end point devices. Each port, however, is connected to only a single ATM device. When a switch receives a cell, it routes the cell to the appropriate port simply by checking its virtual channel number, which has meaning only to the switch itself. By looking at the VPI and VCI of a cell, the switch can determine to which port the cell should be routed. Before actually sending the cell, the switch replaces the virtual channel number of the cell with that which will be needed at the next switch.

In order for this switching to occur, a visual connection must have already been established through all of the involved switches. This occurs using "call set-up" messages. To set up a virtual connection, an originating end point device exchanges "signaling" messages with a destination end point device and with the intervening switches. These messages contain detailed information about the connection, such as source and destination addresses, traffic parameters, and quality of service requirements. All devices along the desired path store this information and associate it with a specific virtual connection, specified within each device by a particular VPI/VCI combination. Subsequent data communications can then take place without any further specification of the detailed addressing information, with only the VPIs and VCIs.

The description given above is merely an overview. Further, more detailed information can be found in *Asynchronous Transfer Mode: Bandwidth for the Future*, by Jim Lane (Telco Systems, 1992); and in *Asynchronous Transfer Mode: Solution for Broadband ISDN*, 2d ed., by Martin de Prycker (Ellis Norwood, 1993). Both of these references are incorporated by reference.

The physical network architecture shown in FIG. 1 creates some practical difficulties in implementing an ATM protocol. One such difficulty is that a typical ATM architecture requires a switch port for every physical end point device. This can be expensive in a public system in which every home in a very large metropolitan area might have an end point device. Another potential difficulty arises from the fact that upstream and downstream communications in the system of FIG. 1 take place over different channels. A typical ATM architecture, however, expects that a node switch will be able to conduct both upstream and downstream communications with a device over the same switch port. These difficulties are solved by the architecture and methodical steps presented below.

SUMMARY OF THE INVENTION

The invention described below provides an architecture which allows the ATM protocol to be used in a public hybrid fiber/coax network, without requiring a dedicated ATM switch port for every home. In the preferred embodiment, an access resource manager at the headend assigns each STB to a specific combination of upstream and downstream communications channels. Multiple STBs are potentially assigned to the same upstream and downstream ATM switch ports. Prior to data transfer, however, an extended autoregistration procedure assigns an exclusive range of virtual channel number to each STB. When setting up virtual connections with a particular STB, a virtual channel number is chosen within the range assigned to the STB. During data transfer, data cells originating from or destined to the particular STB can be identified by their virtual channel numbers. This allows the same upstream or downstream switch port to be used for a plurality of STBs.

DETAILED DESCRIPTION OF THE PREFERRED EMBODIMENT

Figure 1:
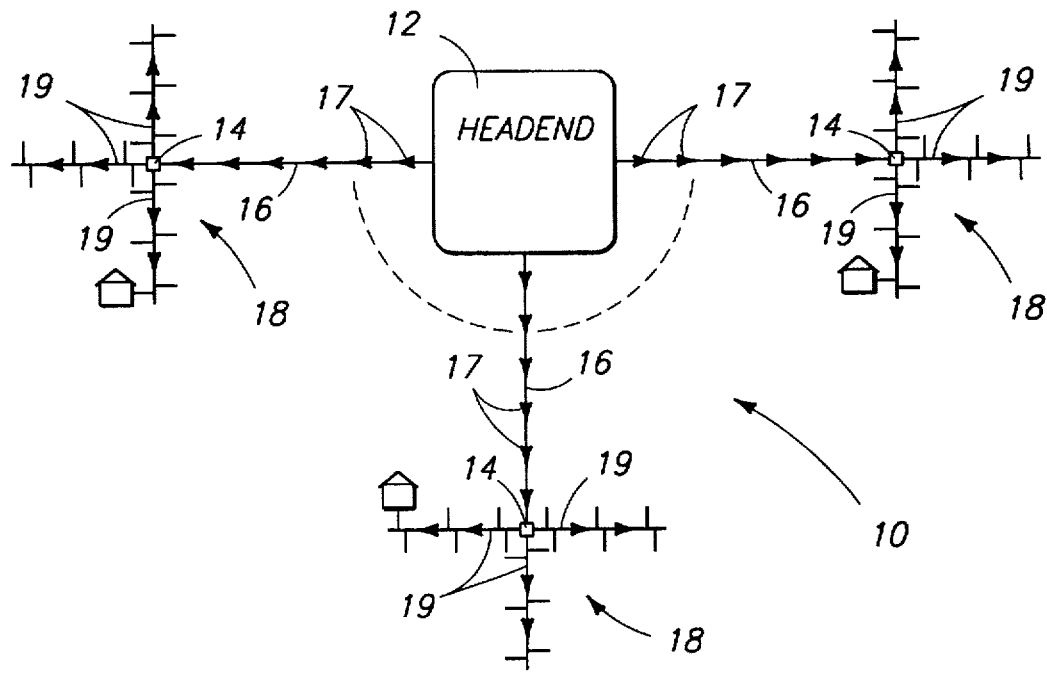
FIG. 1 is a schematic diagram of a traditional broadcast CATV system.
Figure 2:
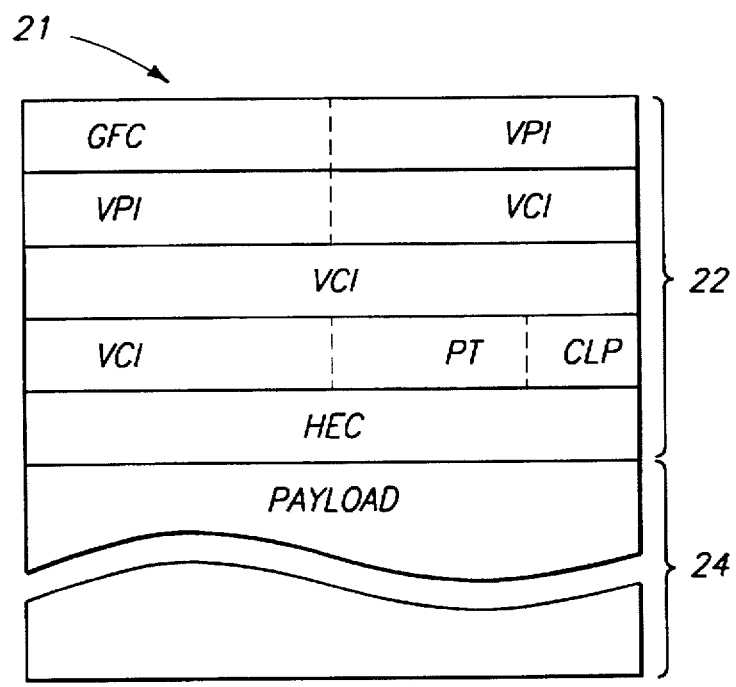
FIG. 2 is a diagram of an ATM cell.
Figure 3:
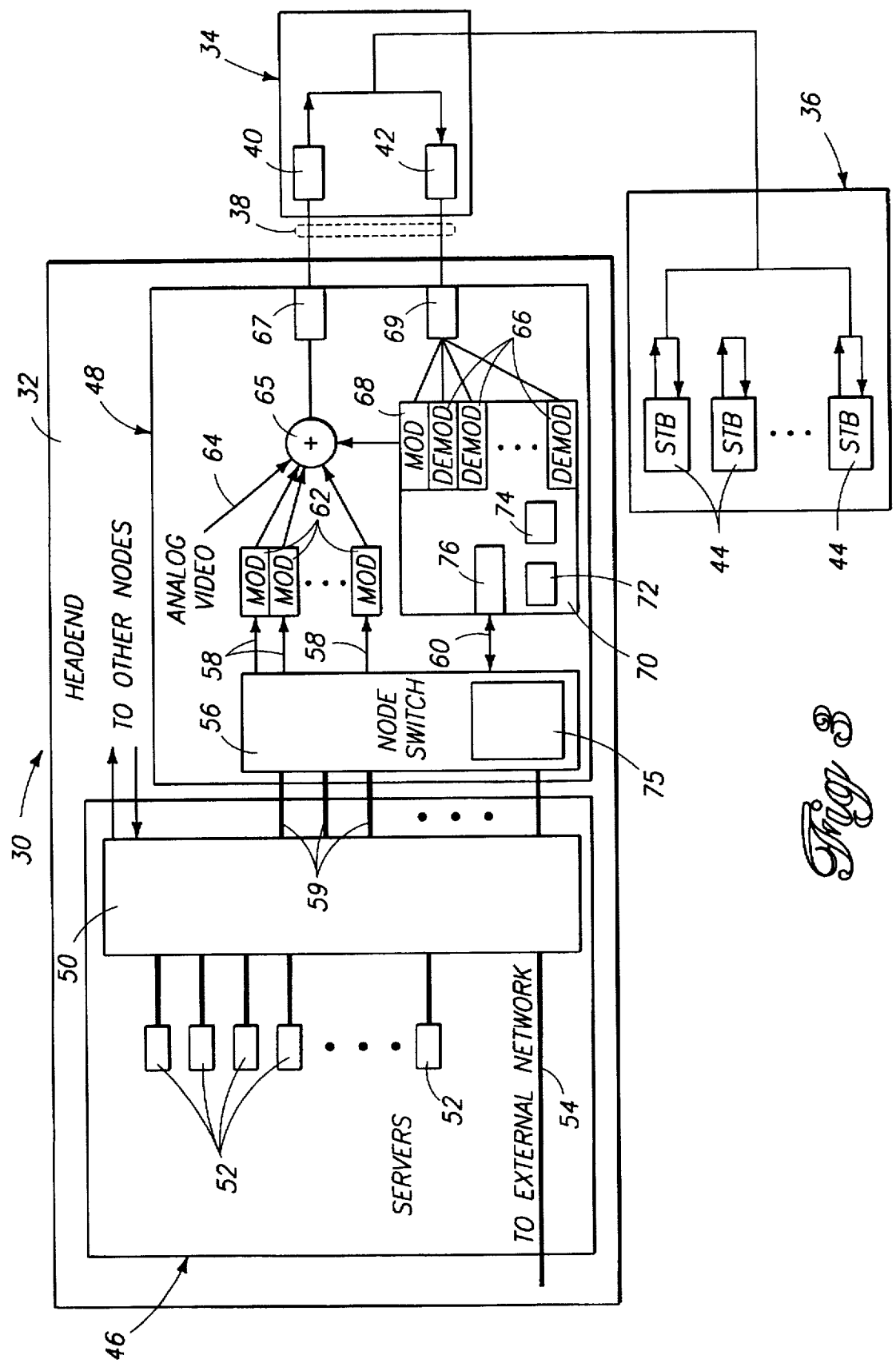
FIG. 3 is a block diagram of an HFC switched broadband interactive video entertainment network in accordance with a preferred embodiment of the invention.

FIG. 3 shows an interactive video entertainment network or system 30 having a switched broadband HFC architecture in accordance with a preferred embodiment of the invention. System 30 uses an ATM protocol as discussed above, in which ATM data cells are transferred between end point devices over virtual connections identified by virtual channel numbers. System 30 includes a cable headend 32, at least one and preferably a plurality of neighborhood nodes 34 (only one is shown), and a coax distribution plant 36. In the preferred embodiment, bi-directional communication between the headend and the neighborhood node is through a fiber-optic trunk 38 between headend 32 and neighborhood node 34. Neighborhood node 34 includes forward and reverse optoelectronic conversion circuits 40 and 42 for converting between the optical signal carried on fiber-optic trunk 38 and the electronic signal carried by coax distribution plant 36. The fiber-optic trunk, the neighborhood node and the coax plant form an analog transmission medium that connects to and serves a plurality of subscriber interface units or set-top boxes (STBs) 44. The STBs are configured as ATM end point devices in individual homes. More specifically, the fiber-optic trunk and coax distribution plant provide a plurality of upstream and downstream passband communications channels between the headend and the individual STBs. However, there is not a dedicated channel for each STB. Rather, STB's share upstream and downstream data channels using the apparatus and methods described below.

Each STB has programmable components for communicating with headend 32 using the ATM protocol and higher level protocols such as internet protocol (IP). An individual STB also has modulators and demodulators as appropriate to tune to designated upchannels and downchannels. For instance, an STB has one demodulator which is permanently tuned to a control downchannel. Another demodulator is settable or tunable to a selected data downchannel. A modulator is settable or tunable to a selected data upchannel. An STB might also have a traditional tuner for receiving analog broadcast signals from headend 32.

Figure 4:
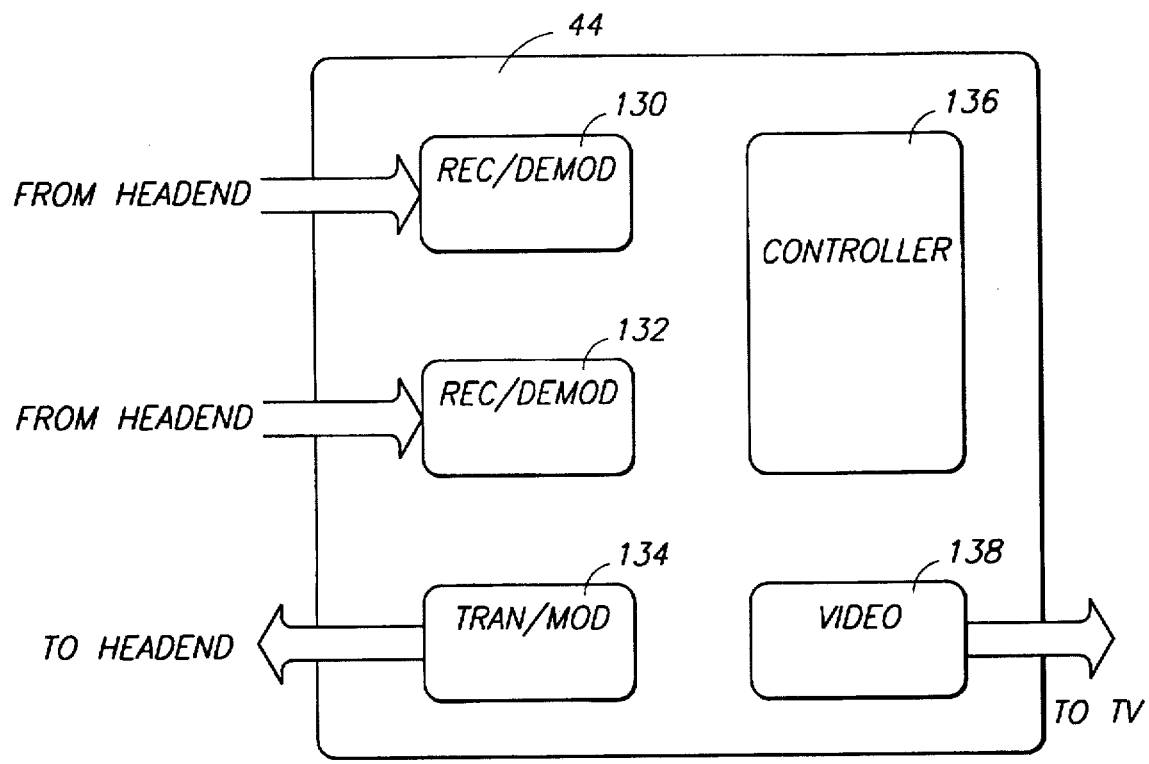
FIG. 4 is a block diagram of an STB in accordance with a preferred embodiment of the invention.

FIG. 4 shows the general configuration of a preferred STB 44 in accordance with this invention. Preferred STB 44 comprises first and second RF data receivers and demodulators 130 and 132. First RF data receiver and demodulator 130 is permanently tuned to a fixed frequency or passband communications channel to receive downstream control information. Second RF receiver and demodulator 132 has a variable tuner so that it can be tuned to any one of a plurality of downstream frequencies or passband communications channels for downstream data communications from the headend to the STB. In some cases, the two downstream communications channels might be combined, eliminating the need for first RF data receiver 130.

STB 44 also has an RF modulator and data transmitter 134. Transmitter 134 has a variable tuner so that it can be tuned to any one of a plurality of upstream frequencies or communications channels for upstream ATM data communications from the STB to the headend.

STB 44 furthermore has a communications controller 136 that interacts with the data receivers and data transmitter. In the preferred embodiment, communications controller 136 is a general purpose programmable computer or microprocessor connected to receive demodulated data from data receivers and demodulators 130 and 132, to send ATM data through RF modulator and data transmitter 134, and to tune second RF data receiver and demodulator 132 and RF modulator and data transmitter 134 to desired frequencies or communications channels.

STB 44 has further components for performing other tasks not directly related to this invention, such as a video driver 138 for displaying graphic images on an associated TV set. While the most common use for an STB such as described above is in conjunction with televisions, an STB in accordance with the invention will also enable subscribers to access interactive online services, including services which allow a subscriber to select from a large number of movies and to schedule a selected movie to play at any desired time. Other services might include financial services or retail services. For instance, a subscriber might be able to transfer funds between bank accounts or to order pizza delivery through interactive services available on the switched broadband network. Furthermore, STBs might be used to allow other devices in the home, such as telephones or home computers, to connect to the switched network.

The plurality of upstream and downstream passband communications channels between the headend and the STBs are frequency-division multiplexed over the fiber-optic trunk. The channels are preferably 6 MHz portions of a frequency spectrum ranging from 5 MHz to 750 MHz. These same channels are converted and duplicated on coax distribution plant 36 to provide communications between STBs 44 and neighborhood node 34. The channels carried by fiber trunk 38 and coax distribution plant 36 include downchannels and upchannels. Multiple 6 MHz downchannels are provided in the 50 MHz through 750 MHz spectrum. One of the downchannels is designated as a control downchannel, while the remaining downchannels are data downchannels. First RF data receiver and demodulator 130 of the subscriber interface unit described above is tuned to the control downchannel. The single control downchannel is shared by all STBs served by the neighborhood node and is also used as a default downchannel for initial communications between the headend and an STB.

The upchannels occupy the 5 MHz to 42 MHz spectrum, using a passband scheme similar to that of the downchannels. One of the upchannels is designated as a default upchannel, to be used by all STBs when they are initially connected or turned on. RF modulator and data transmitter 134 is initially tuned to this upchannel for communications prior to the assignment of communications channels as described below. The other upchannels will be referred to herein as data upchannels. Each upchannel is sub-divided into logical channels for use by a plurality of STBs by using a medium access (MAC) communications protocol. Because the system might be used for real-time applications, the MAC protocol used for the data upchannels should be a reservation-based protocol such as a time-division multiple access scheme with reservation, rather than a random access protocol. A random access protocol might be suitable for the default upchannel or for upchannels which are designated strictly for upstream control data.

Referring again to FIG. 3, headend 32 includes shared components 46 and dedicated components 48. The shared components are used by all neighborhood nodes and STBs served by headend 32. The dedicated components are replicated for each neighborhood node 34.

Shared components 46 include an ATM distribution network 50 and one or more headend servers 52. The ATM distribution network contains any required ATM switches for establishing whatever connections might be required to support individual STBs. The system includes connections 54 to external networks so that subscribers can access services provided by outside vendors and other networks. ATM distribution network 50 also includes connections to servers 52. Servers 52 contain libraries of video or other information streams which can be selected by subscribers for viewing or otherwise accessing on demand.

Dedicated components 48 include an ATM node switch 56 associated with headend 32, having multiple downstream switch ports 58 and at least a single upstream or bi-directional switch port 60. The downstream switch ports are individually connected to send communications to the STBs through respective individual downstream communications channels. In general, there is a downstream switch port 58 corresponding to each 6 MHz downchannel. The single upstream or bi-directional switch port 60 is configured to receive communications from the plurality of STBs through the plurality of upstream communications channels. As discussed above, each STB is configured to tune to any one of a plurality of the downstream communications channels and therefore to connect to any one of a plurality of the switch ports for communicating with the ATM node switch.

A data transmitter and modulator 62 is connected between each downstream switch port and the fiber-optic hunk to transmit modulated data on a selected passband channel from the ATM node switch, to the neighborhood node, and then through the coax plant to individual STBs. A separate, analog feed 64 is provided for conventional broadcast video. A control channel transmitter or modulator 68 is also included in the dedicated components. Control channel transmitter 68 modulates the single control downchannel to the STBs associated with a particular network node. The outgoing signals are combined in a combiner 65 and converted to optical format by a modulating laser device 67.

The dedicated components also include facilities for receiving data on the upstream communications channels. Separate receivers and demodulators 66 are provided for receiving modulated signals from STBs on each of the upchannels and for converting these signals to digital format. An optical-to-electronic converter 69 is used to provide an electronic signal to the demodulators from the fiber-optic hunk 38.

Dedicated components 48 furthermore include an upstream controller 72 and an access resource manager 74. Upstream controller 72 is responsible for multiplexing upstream data from the multiple logical and physical upchannels onto single switch port 60 of ATM node switch 56 and for managing the MAC protocol used by each upchannel. Access resource manager 74 is responsible for allocating both upstream and downstream channels to individual STBs as will be more fully explained below. These components, along with demodulators 66 and control channel transmitter 68, are preferably integrated on a single microprocessor-based platform such as a personal computer (PC) 70. For instance, the demodulators and the control downchannel transmitter might be implemented in a single expansion board of a personal computer. Using this configuration, both the upstream controller and the access resource manager are implemented as programs running on the personal computer. Other implementations are of course possible and might be dedicated in some situations. For instance, it may be desirable to incorporate most of the dedicated components in an ATM node switch.

The physical architecture of system 30 is different than a traditional ATM architecture. In a traditional system, a single end-point device such as an STB would communicate through a single port of an adjacent node switch for both upstream and downstream data transfer. Furthermore, the STB would always be connected to the same switch port of the adjacent switch. In system 30, however, a single STB uses different switch ports of node switch 56 for upstream and downstream data cells, respectively. Also, system 30 has provisions for dynamically allocating upstream and downstream data channels, so that an STB does not always use the same channels or switch ports. Furthermore, in a traditional architecture each STB would be connected to its own dedicated switch port. In the system of FIG. 3, however, there are many more STBs than available channels or switch ports. Therefore, multiple STBs share the same channels and switch ports, each communications channel being designated for use by more than one of the STBs.

To accommodate these network characteristics, a single downstream switch port 58 is used for concurrent downstream data transfer to a plural and dynamically changing group of STBs within a particular neighborhood node. Node switch 56 is programmed or configured to accept channel request messages from STBs and to assign each STB to a selected pair or combination of downchannels and upchannels. Each STB is dynamically tunable to different combinations of upstream and downstream communications channels for bi-directional data communications with the headend through the ATM node switch. After receiving their channel assignments, groups of STBs tune respectively to their single assigned data downchannels and corresponding downstream switch ports 58 to receive multiplexed ATM cells from the headend, and to their assigned logical upchannels to transfer upstream data.

As part of the registration procedure, each STB is assigned its own range of virtual channel numbers to be used in all future data communications with the node switch. The node switch maintains an address table 75 corresponding to each of its switch ports to keep track of the exclusive ranges assigned to each STB.

Figure 5:
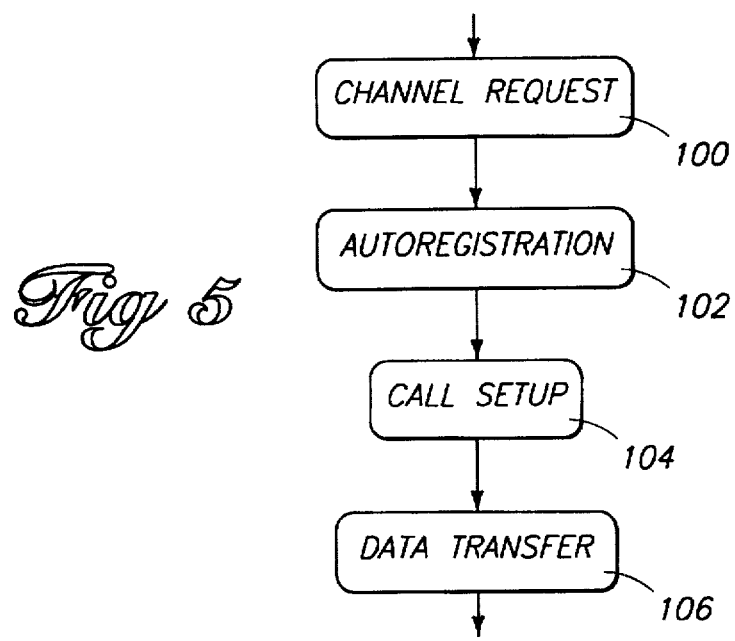
FIG. 5 is a flow diagram of the general steps performed in the preferred embodiment of the invention for transferring ATM data cells.

FIG. 5 shows the general steps performed by the various components described above to accomplish initialization and actual data transfer. Note that the following description assigns individual steps to specific hardware and software elements of the system. However, various distributions of responsibility are possible and the invention is not generally intended to be limited by the specific allocations of functions inherent in the preferred physical embodiment of the invention.

When an STB is first connected to system 30, or when it is first turned on, it must connect to a headend server to download operating information such as applications and other software objects. The first step performed by an initializing STB is a step 100 of sending a channel request to the headend. As a result of the channel request, headend 32 sends a channel assignment message to the STB indicating designated upstream and downstream communications channels for subsequent upstream and downstream data communications. The STB receives the channel assignment message and in response tunes receiver 132 and transmitter 134 to the designated channels for subsequent reception and transmission of ATM data cells.

A subsequent step 102 comprises registering the STB with the downstream switch port 58 associated with the assigned downstream communication channel, in a procedure referred to as autoregistration. In order to establish an ATM connection between two ATM devices, each device must know the ATM address of the other. Autoregistration step 102 provides the means for dynamically exchanging addressing information between adjacent ATM entities and provides a method for the ATM entities to agree upon the ATM addresses in effect. In accordance with the invention, an extended autoregistration procedure is implemented in which an STB is assigned one specific range of virtual channel numbers for use in further downstream communications with the headend, and another range of virtual channel numbers for use in subsequent upstream communications. This allows the node switch 56 to differentiate between the plurality of STBs connected to each of its switch ports, and also allows a particular STB to identify downstream messages directed to it.

After autoregistration, the STB can communicate with the headend to obtain or download any required software elements such as an operating system. The STB makes itself known on the network by sending a broadcast or multicast message using an ATM cell with a well-known VPI/VCI combination, and with its ATM address in the cell's payload. One or more servers respond by assigning a high-level network address for the STB and by providing information regarding available servers. The STB replies with additional information regarding which server or servers it wishes to connect to. Once connected in this manner, the STB can download operating software and other applications needed prior to actual data transfer.

Prior to actual data transfer, a call setup step 104 is performed to establish an ATM virtual connection. This step is performed using an extension to the ATM Q.293 1 signaling protocol as described below. Following step 104 is a step 106 which comprises transferring ATM data cells between a particular STB and the node switch through the ports associated with the STBs assigned upchannels and downchannels. Each ATM data cell has a virtual channel number which is within the range of virtual channel numbers assigned to the STB.

These procedures are explained in more detail in the sections which follow.

Channel Request

Before an end-to-end connection can be set up with a particular STB, the STB is assigned to an upchannel and a downchannel for communication. To receive an assignment, the STB first sends a channel request to the access resource manager at the headend. This message is sent via the default logical upchannel. All STBs share the default logical upchannel using a random access mechanism such as time-slotted Aloha or another MAC protocol. Upstream controller 72 receives the channel request message and passes it to access resource manager 74. To process the channel request, the access resource manager queries the current connection status of the various switch ports and associated data downchannels (from the ATM node switch) and data upchannels (from the upstream controller), and assesses relative available capacities of the individual switch ports and communications channels. The access resource manager then assigns an individual STB to a specific combination of the upstream and downstream communications channels. The assignment is determined based at least in part upon relative available capacity of the communications channels and their associated switch ports. In one embodiment, the access resource manager allocates those data upchannels and downchannels with the lowest load to the requesting STB for load balancing. The assignment is made by sending an allocation or assignment message to the STB through the dedicated control downchannel. In response, the STB tunes to the designated combination of upstream and downstream channels through their associated switch ports.

The message format for the channel request message is not an ATM standard. Rather, it comprises a single ATM cell containing a VPI/VCI combination which is dedicated the specific purpose of identifying channel request messages. The single cell includes in its payload the "user part" of the STB's ATM address. The ATM protocol uses an addressing scheme referred to as the Private ATM Address Structure. It consists of multiple fields. Two of these fields, the End System Identifier (ESI) and the Selector (SEL) fields form the "user part" of an ATM address and are supplied in this case by the STB. In public systems, the user part for each STB is unique. All other fields of the Private ATM Address Structure form a "network prefix." The network prefix typically has the same value for all STBs connected to the stone port of an ATM node switch. In this case, the node switch supplies the network prefix to the STB during the autoregistration procedure described below.

Including the user part of the STB's ATM address in the chapel request message allows the access resource manager to keep track of which channels have been allocated to which STBs. Furthermore, formatting the channel request message as a single cell avoids cell interleaving problems which might otherwise occur because of having many STBs sharing the same upchannel. For instance, the cells of a multi-cell message from a particular STB might be interleaved with a similar multi-cell message from a different STB. With multiple STBs sharing the same upchannel, it would be impossible for the access resource manager to distinguish between the cells of the different messages. Another way to avoid interleaving problems, if multiple cells were necessary for a channel request message, would be to include the user part of the requesting STBs ATM address in the payload of each of the multiple ATM cells. Multiple cells should not be necessary, however, since all information required to be transferred in a cell request message should easily fit within a single 48-byte ATM payload.

Once a channel allocation is determined, the access resource manager sends the assignment message through control chapel transmitter 68. The assignment message comprises a plurality of ATM cells that specify the allocated channels. Each cell of the allocation message uses the same dedicated VPI/VCI combination used in the channel request message. Each cell includes the user address part of the requesting STB in its payload, along with a specification of the allocated upchannel and downchannel. The various STBs connected to receive data on the control downchannel are programmed and configured to disregard any allocation messages destined for other STBs, as determined by the ATM user address part contained in the payload of allocation message cells. Alternatively, the access resource manager may assign an STB ID as part of the assignment of upchannels and downchannels, and the STB would then use this ID to register.

Extended Autoregistration

Once upstream and downstream channels have been assigned, each STB registers itself with the ATM switch port corresponding to the assigned data downchannel. An autoregistration procedure is available as a known ATM protocol, as described in the *ATM User-Network Interface Specification*, Ver. 3, -published by Prentice-Hall, 1993, which is hereby incorporated by reference. The known autoregistration protocol is an extension to the Interim Local Management Interface (ILMI) described in the same reference.

In the known autoregistration procedure, an ATM switch sends to the newly-connected STB the network part of the STB's ATM address as chosen by the ATM switch. The STB combines the network address part of the ATM address (as received from the switch) with its user address part and sends the entire ATM address back to the switch for registration. The ATM switch then stores the entire ATM address in an address table that maps a switch port number to a particular ATM address. This address table is used during call setup procedures to establish virtual channels. Since the ATM switch expects only one client device to communicate on each switch port, it maintains only a single table entry for each switch port.

When using the extended autoregistration procedure of the invention, node switch 56 maintains an address table 75 for each switch port. The address table for a particular switch port has entries for each STB registered with that switch port. Each entry contains both the ATM address of an STB registered with that switch port and a range or ranges of virtual channel numbers assigned for exclusive use by that STB in conjunction with the switch port. When a cell is received by node switch 56, the node switch can identify which connected STB sent the cell by checking the virtual channel number of the cell against the values stored in the address table. When establishing virtual connections, node switch 56 ensures that for connections with a particular STB, virtual channel numbers are used which are within the range of such values assigned to that STB. Individual STBs are programmed to accept only those downstream ATM data cells having virtual channel numbers within the range of virtual channel numbers assigned to them.

Figure 6:
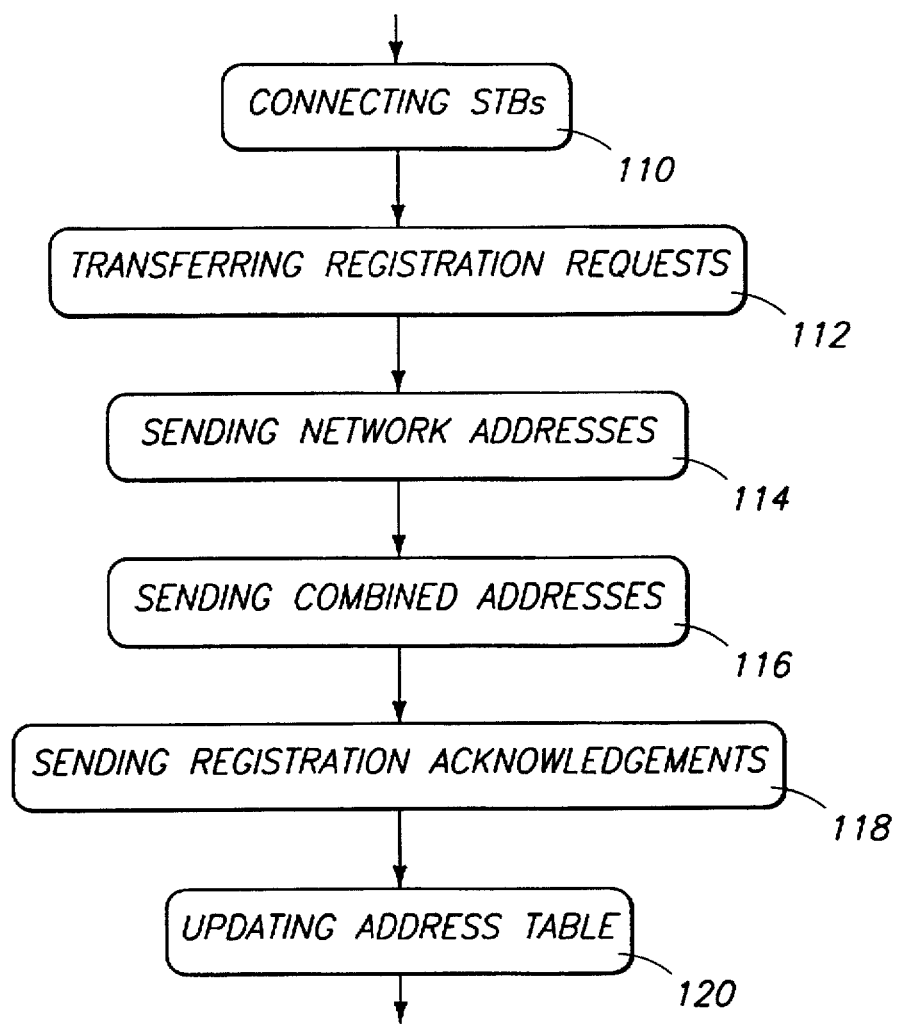
FIG. 6 is a flow diagram showing preferred autoregistration steps in accordance with the invention.

FIG. 6 shows the steps of an extended autoregistration procedure in accordance with the preferred embodiment of the invention. The extended autoregistration procedure is needed because many STBs are connected to a single downstream switch port of node switch 56. This is indicated by block 110, which shows a step of connecting a plurality of STBs for ATM data communications with a single switch port 58 of ATM node switch 56.

A step 112 comprises transferring registration request messages from the plurality of STBs connected to the single switch port. The individual STBs are programmed or configured to send these messages as ATM data cells to the ATM node switch after the STBs have received their channel assignments as described above. Each STB sends its registration request message on the upchannel assigned to it during the channel request procedures. In one embodiment of the invention, each registration request message is sent as a single ATM cell having a payload which contains the user part of the requesting STBs ATM address, indicating which STB the message is from. Sending the message as a single cell avoids interleaving problems which might otherwise occur if two different STBs were simultaneously requesting registration. In another embodiment, the registration request messages are sent as multiple ATM cells. In this case, each ATM cell forming the registration request message contains the sending STBs user address part so that the ATM node switch can differentiate between messages from different STBs. In addition to STB address information, a registration request message's payload contains the port number of the downstream switch port associated with the downstream channel assigned to the STB. It is not necessary to specify an upstream port since all upstream communications enter switch 56 through switch port 60. The cell or cells of a registration request message are sent using a standard or pre-defined ILMI virtual channel, identified by a well-known virtual channel number having VPI equal to 0 and VCI equal to 16.

The upstream controller receives the registration request messages and forwards them to ATM node switch 56 through switch port 60. Node switch 56 accepts the registration request messages and responds in a step 114 of sending to the STB the network part of the STBs ATM address as chosen by the node switch. This message is sent over the assigned downchannel, as indicated by the request message, again using the standard ILMI virtual channel number having VPI equal to 0 and VCI equal to 16. The response of step 114 might be a single ATM cell or a plurality of ATM cells. Regardless, each such cell contains as part of its payload the user address part of the STB which is to receive the message. This allows each of the various STBs which are tuned to the same downchannel to intercept only those ILMI messages intended for it. In an optional step 116, the STB combines the network address part with its user part and sends the entire ATM address back to node switch 56. This step in many cases will not be necessary because the node switch already has the STBs user address part by virtue of having received a registration request message.

Step 116 comprises assigning exclusive ranges of virtual channel numbers to the respective STBs to be used in future ATM data cells transferred between said respective STBs and the ATM node switch through the assigned single downstream switch port and through bi-directional port 60. For instance, the node switch might assign a single and unique VPI to a particular STB for use in both upstream and downstream communications while allowing any VCI to be used by the STB in conjunction with the assigned VPI. Alternatively, the node switch might assign one VPI, such as $VPI_U$, for use in the upstream direction, while assigning a different VPI, such as $VPI_D$, for use in the downstream direction. Since the VPI is eight bits, these options would allow up to 256 STBs to be connected to each switch port. In the downstream direction, this number of simultaneously-connected STBs might be sufficient. In the upstream direction, however, all STBs communicate through a single port. The total number of STBs associated with a neighborhood node will likely exceed 256. Accordingly, it may be desirable to also assign a few of the most significant bits of VCI for exclusive use by each STB in the upstream direction, in combination with the assigned VPI. This us equivalent to assigning a single VPI and a range of VCIs. Each VCI would inherently have a base value with all of its unassigned, least significant bits equal to binary 0.

More generally, a single VPI/VCI base value is assigned in such a way as to leave an arbitrary number of low order bits of the VPI/VCI combination equal to zero. This is equivalent to assigning or fixing a certain number of upper order bits of the VPI/VCI combination. The number of such bits can be more or less than the number of VPI bits. Such base values are referred to herein as a DVPIs and UVPIs, depending on whether they are assigned for downstream or upstream communications, respectively. The assigned range includes any VPI/VCI value having upper bits equal to those of the assigned base value.

Step 118 comprises sending registration acknowledgment messages from the ATM node switch to the respective ATM set-top boxes notifying them of their assigned exclusive ranges of virtual channel numbers. Each acknowledgment message is preferably sent as a single ATM cell which includes in its payload the receiving STBs user address part and an indication of the assigned ranges of virtual channel numbers. Alternatively, each acknowledgment message might comprise a plurality of cells, each of which contains the receiving STBs user address part. Individual STBs are programmed or configured to disregard any such downstream cells bearing other addresses.

Step 120 comprises maintaining or updating address tables 75 within ATM node switch 56. Updating step 120 comprises creating individual entries in the appropriate address table for each of the STBs from which registration request messages have been accepted. Such an entry for an individual STB contains at least the user part of the STBs ATM address and an indication of the exclusive ranges of virtual channel numbers assigned to the STB. Address tables are maintained for each of downstream ports 58 as well as for bi-directional port 60, through which all upstream data cells are received.

Call Setup

Before actual data transfer, it is necessary to establish a virtual connection between an STB and a headend server 52. Such a connection is initiated by the STB by sending an upstream call setup message from the STB using a "signaling" protocol generally in accordance with Q.2931 as described in *ATM User-Network Interface Specification*, cited above. The Q.2931 standard reserves a single virtual channel number, with VPI equal to 0 and VCI equal to 5, for signaling messages of this type. In the preferred embodiment of the invention, however, a signaling or call setup message is identified by a cell having VPI equal to $VPI_U$ and VCI equal to 5, wherein $VPI_U$ is the VPI assigned to the STB for upstream data communications. If upper bits of VCI have been assigned a signaling or call setup message is identified by a cell having VPI equal to $VPI_U$ and VCI equal to $VCI_U+$ 5, wherein $VCI_U$ is the base value of VCI assigned to the STB for upstream data communications.

This approach can be generalized as follows. Whenever a certain type of communication normally utilizes a well-known or pre-defined VPI/VCI combination, the combination is added to the assigned base value for communications under the scheme described herein. For instance, ILMI messages normally use a VPI/VCI of 0/16. In the preferred embodiment of the invention, an upstream ILMI communication would use a VPI/VCI of UVPI+16. An upstream signaling message would use UVPI+5.

Altering the use of VPI and VCI in this manner allows devices receiving the signaling messages, such as access resource manager 74 and node switch 56, to determine which of the connected STBs the messages are from. It also prevents cell interleaving problems which could otherwise arise if more than one STB were to transmit a signaling messages at the same time.

The call setup message requests an ATM virtual connection at a specified bandwidth. Access resource manager 74 receives the call setup message from upstream controller 72 and determines whether enough resources exist on the assigned upchannel and downchannel to accommodate the requesting STB. If so, the access resource manager forwards the signaling messages to the ATM node switch for end-to-end connection setup. The node switch gives a response in accordance with standard signaling protocols, using the assigned downchannel of the requesting STB and the same virtual channel number used in the call setup message received from the STB. The response will include a specific VPI/VCI combination, within the range assigned for use by the STB, to identify the virtual connection. If there is insufficient available data communications bandwidth on the assigned channels, the access resource manager itself responds to the STB, through the node switch and the assigned downchannel. In this case, the access resource manager dynamically re-assigns the STB to a new combination of upstream and downstream communications channels and associated switch ports as necessary to provide the requested bandwidth between the ATM node switch and the STB. Specifically, the access resource manager sends a new channel assignment message indicating the new channels. The STB is responsive to channel re-assignment messages from the headend to dynamically tune to different upstream and downstream communications channels.

Data Transfer

Once a virtual connection is established, data transfer takes place largely in accordance with standard ATM and higher-level protocols. However, sending STBs must conform to the MAC protocol implemented between the STBs and the headend. Furthermore, each STB must be programmed to accept only those data cells identified by numeric indicators within its assigned range. Node switch 56 simply routes cells according to their specified virtual channel numbers.

Conclusion

The system described above allows the ATM protocol to be used efficiently within the constraints of an HFC fiber-coax cable distribution system. It accomplishes this by providing extended autoregistration and signaling protocols which allow node switch ports to be dynamically allocated to STBs as they connect to the system, and to allow multiple STBs to share the same switch ports. This reduces cost significantly. Furthermore, flexibility and efficiency are gained by configuring the system to use different switch ports for upstream and downstream data cells.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. In an ATM interactive video entertainment network which transfers ATM data cells over virtual connections which are identified by virtual channel numbers contained within the ATM data cells, said ATM network having at least one ATM node switch, said ATM node switch having at least a single switch port for transferring particular ATM data cells between the ATM node switch and a plurality of ATM subscriber interface units that share a common communications channel, a method of registering the plurality of ATM subscriber interface units with said single switch port, the method comprising the following steps:

accepting registration request messages from said plurality of ATM subscriber interface units that are logically connected for communications through the single switch port of the ATM node switch;

assigning exclusive ranges of virtual channel numbers to respective ATM subscriber interface units to be used in said particular ATM data cells transferred between said respective ATM subscriber interface units and the ATM node switch through the single switch port;

transferring the ATM data cells between the plurality of ATM subscriber interface units and the ATM node switch through the single switch port, any particular ATM data cell transferred between a particular ATM subscriber interface unit and the ATM node switch having a virtual channel number which is within a range of virtual channel numbers assigned to said particular ATM subscriber interface unit.

2. A method as recited in claim 1 wherein the assigning step comprises assigning a first exclusive range of virtual channel numbers to the particular ATM subscriber interface unit for downstream communications through a first switch port and a second exclusive range of virtual channel numbers to the particular ATM subscriber interface unit for upstream communications through a second switch port.

3. A method as recited in claim 1 and further comprising sending the registration request messages as particular ATM data cells which include user parts of ATM addresses indicating which of the plurality of ATM subscriber interface units individual registration request messages are from.

4. A method as recited in claim 1, the virtual channel numbers comprising ATM virtual path identifiers and virtual channel identifiers, the method further comprising transferring Interim Local Management Interface messages before assigning the exclusive ranges of virtual channel numbers, the Interim Local Management Interface messages having individual ATM data cells with virtual path identifiers equal to 0 and virtual channel identifiers equal to 16.

5. A method as recited in claim 1, the virtual channel numbers comprising ATM virtual path identifiers and virtual channel identifiers, wherein assigning an exclusive range of virtual channel numbers comprises assigning a single virtual path identifier.

6. A method as recited in claim 1, the virtual channel numbers comprising ATM virtual path identifiers and virtual channel identifiers, wherein assigning an exclusive range of virtual channel numbers comprises assigning a single virtual path identifier, the method further comprising transferring signaling messages whose individual ATM data cells have virtual path identifiers equal to the assigned single virtual path identifier, and virtual channel identifiers equal to 5.

7. A method as recited in claim 1, the virtual channel numbers comprising ATM virtual path identifiers and virtual channel identifiers, wherein assigning an exclusive range of virtual channel numbers comprises assigning a single virtual path identifiers and a range of virtual channel identifiers.

8. A method as recited in claim 1, each virtual channel number comprising a virtual path identifier/virtual channel identifier value, wherein assigning an exclusive range of virtual channel numbers comprises assigning a single virtual path identifier/virtual channel identifier base value, the method further comprising transferring Interim Local Management Interface messages with individual ATM data cells having virtual path identifier/virtual channel identifier values equal to the base virtual path identifier/virtual channel identifier value plus 16.

9. A method as recited in claim 1, each virtual channel number comprising a virtual path identifier/virtual channel identifier value, wherein assigning an exclusive range of virtual channel numbers comprises assigning a single virtual path identifier/virtual channel identifier base value, the method further comprising transferring signaling messages with individual ATM data cells having virtual path identifier/virtual channel identifier values equal to the base virtual path identifier/virtual channel identifier value plus 5.

10. In an ATM interactive video entertainment network which transfers ATM data cells over virtual connections which are identified by virtual channel numbers contained within the ATM data cells, said ATM network having at least one ATM node switch, said ATM node switch having at least a single switch port for transferring particular ATM data cells between the ATM node switch and a plurality of ATM subscriber interface units, a method of registering such a plurality of ATM subscriber interface units with said single switch port, the method comprising the following steps:

accepting registration request messages from said plurality of ATM subscriber interface units that are logically connected for communications through the single switch port of the ATM node switch, the individual registration request messages including user parts of ATM addresses indicating which of the plurality of ATM subscriber interface units the individual registration request messages are from;

assigning exclusive ranges of virtual channel numbers to respective ATM subscriber interface units to be used in said particular ATM data cells transferred between said respective ATM subscriber interface units and the ATM node switch through the single switch port;

maintaining an address table in the ATM node switch corresponding to the switch port;

creating entries in the address table corresponding to the switch port for the respective ATM subscriber interface units from which registration request messages have been accepted, such an entry for an individual ATM subscriber interface unit containing at least the user part of said individual ATM subscriber interface unit's ATM address and an indication of an exclusive range of virtual channel numbers assigned to said individual ATM subscriber interface unit.

11. A method as recited in claim 10 wherein the assigning step comprises assigning a first exclusive range of virtual channel numbers to a particular ATM subscriber interface unit for downstream communications through a first switch port and a second exclusive range of virtual channel numbers to the particular ATM subscriber interface unit for upstream communications through a second switch port.

12. A method as recited in claim 10 and further comprising sending registration acknowledgment messages from the ATM node switch to the respective ATM subscriber interface units notifying them of their assigned exclusive ranges of virtual channel numbers, the registration acknowledgment messages including the user parts of the ATM subscriber interface units' ATM addresses.

13. A method as recited in claim 10 and further comprising:

sending registration acknowledgment messages from the ATM node switch to the respective ATM subscriber interface units notifying them of their assigned exclusive ranges of virtual channel numbers, the registration acknowledgment messages including the user parts of the ATM subscriber interface units' ATM addresses;

wherein the step of sending the registration acknowledgment messages comprises formatting an individual registration acknowledgment message as a single ATM cell.

14. A method as recited in claim 10 an individual registration request messages comprises a single ATM cell.

15. A method as recited in claim 10 and further comprising:

sending registration acknowledgment messages from the ATM node switch to the respective ATM subscriber interface units notifying them of their assigned exclusive ranges of virtual channel numbers;

wherein the step of sending the registration acknowledgment messages comprises formatting an individual registration acknowledgment message as a plurality of ATM cells each containing the user part of the ATM subscriber interface unit which is to receive said individual registration acknowledgment message.

16. A method as recited in claim 10 wherein an individual registration request message comprises a plurality of ATM cells each containing the user part of the ATM subscriber interface unit sending said individual registration request message.

17. A method of transferring ATM data cells in an ATM network over virtual connections which are identified by virtual channel numbers contained within the ATM data cells, said ATM network having at least one ATM node switch, said ATM node switch having at least a single switch port for transferring particular ATM data cells between the ATM node switch and a plurality of ATM subscriber interface units, the method comprising:

registering the plurality of ATM subscriber interface units with the single switch port wherein the registering step comprises utilizing the method of claim 10;

transferring certain ATM data cells between a particular ATM subscriber interface unit and the ATM node switch through the single switch port, each of said certain data cells having a virtual channel number which is within the range of virtual channel numbers assigned to said particular ATM subscriber interface unit.

18. In an ATM interactive video entertainment network which transfers ATM data cells over virtual connections which are identified by virtual channel numbers contained within the ATM data cells, said ATM network having at least one ATM node switch, said ATM node switch having at least a single switch port for transferring particular ATM data cells between the ATM node switch and a plurality of ATM subscriber interface units, a method of registering such a plurality of ATM subscriber interface units with said single switch port, the method comprising the following steps:

connecting said plurality of ATM subscriber interface units for ATM data communications with the single switch port of the ATM node switch;

sending registration request messages from the plurality of ATM subscriber interface units to the ATM node switch, the individual registration request messages including user parts of ATM addresses indicating which of the plurality of ATM subscriber interface units the individual registration request messages are from;

assigning exclusive ranges of virtual channel numbers to respective ATM subscriber interface units to be used in the ATM data cells transferred between said respective ATM subscriber interface units and the ATM node switch;

sending registration acknowledgment messages from the ATM node switch to the respective ATM subscriber interface units notifying them of their assigned exclusive ranges of virtual channel numbers, the registration acknowledgment messages including the user parts of the ATM subscriber interface units' ATM addresses;

maintaining an address table in the ATM node switch corresponding to the switch port;

creating entries in the address table corresponding to the switch port for the respective ATM subscriber interface units from which registration request messages have been accepted, such an entry for an individual ATM subscriber interface unit containing at least the user part of said individual ATM subscriber interface unit's ATM address and an indication of an exclusive range of virtual channel numbers assigned to said individual ATM subscriber interface unit.

19. A method of transferring ATM data cells in an ATM network over virtual connections which are identified by virtual channel numbers contained within the ATM data cells, said ATM network having at least one ATM node switch, said ATM node switch having at least a single switch port for transferring particular ATM data cells between the ATM node switch and a plurality of ATM subscriber interface units, the method comprising:

registering the plurality of ATM subscriber interface units with the single switch port wherein the registering step comprises utilizing the method of claim 10;

transferring certain ATM data cells between a particular ATM subscriber interface unit and the ATM node switch through the single switch port, each data cell having a virtual channel number which is within a range of virtual channel numbers assigned to said particular ATM subscriber interface unit.

20. An ATM node switch for use in an ATM interactive video entertainment network which transfers ATM data cells over virtual connections identified by virtual channel numbers contained within the ATM data cells, the ATM node switch comprising:

at least a single switch port for transferring particular ATM data cells between the ATM node switch and a plurality of ATM subscriber interface units, the ATM node switch being configured to accept registration request messages from a plurality of ATM subscriber interface units;

an address table corresponding to the switch port, the address table having entries for the respective ATM subscriber interface units from which registration request messages have been accepted, such an entry for an individual ATM subscriber interface unit containing at least the user part of said individual ATM subscriber interface unit's ATM address and an indication of a range of virtual channel numbers assigned for exclusive use by said individual ATM subscriber interface unit in transferring data cells between the ATM node switch and said individual ATM subscriber interface unit through the single switch port.

21. An ATM node switch as recited in claim 20 wherein the registration request messages include user parts of ATM addresses indicating which of the plurality of ATM subscriber interface units the individual registration request messages are from.

22. An ATM node switch as recited in claim 20 wherein the switch port is configured to send registration acknowledgment messages to the ATM subscriber interface units notifying them of their ranges of virtual channel numbers, the registration acknowledgment messages including the user parts of the ATM subscriber interface units' ATM addresses.

23. An ATM node switch as recited in claim 20 wherein:
  the switch port is configured to send registration acknowledgment messages to the ATM subscriber interface units notifying them of their ranges of virtual channel numbers, the registration acknowledgment messages including the user parts of the ATM subscriber interface units' ATM addresses;
  wherein an individual registration acknowledgment messages comprises only a single ATM cell.

24. An ATM node switch as recited in claim 20 wherein:
  the switch port is configured to send registration acknowledgment messages to the ATM subscriber interface units notifying them of their ranges of virtual channel numbers;
  wherein an individual registration acknowledgment messages comprises a plurality of ATM cells each containing the user part of the ATM subscriber interface unit which is to receive said individual registration acknowledgment message.

25. An ATM node switch as recited in claim 20 wherein the virtual channel numbers comprise ATM virtual path identifiers and virtual channel identifiers.

26. An ATM node switch as recited in claim 20 wherein the single switch port is for downstream communications with the plurality of subscriber interface units, the node switch comprises another switch port for upstream communications with the plurality of subscriber interface units the ATM node switch having an address table for each of the switch ports.

27. An ATM node switch as recited in claim 20 and further comprising a plurality of ATM subscriber interface units connected for downstream ATM data communications through the single switch port.

28. An ATM interactive video entertainment network which transfers ATM data cells over virtual connections identified by virtual channel numbers contained within the ATM data cells, the ATM network comprising:

an ATM node switch having at least a single switch port;

a plurality of ATM subscriber interface units in individual neighborhood homes connected for ATM data communications through the single switch port;

the ATM subscriber interface units being configured to send registration request messages to the ATM node switch, the registration request messages including user parts of ATM addresses indicating which of the plurality of ATM subscriber interface units sent the request messages;

the ATM node switch having an address table corresponding to the switch port, the address table having entries for respective ATM subscriber interface units from which registration request messages have been received, such an entry for an individual ATM subscriber interface unit containing at least the user part of said individual ATM subscriber interface unit's ATM address and an indication of a range of virtual channel numbers assigned for exclusive use by said individual ATM subscriber interface unit in transferring data cells between the ATM node switch and said individual ATM subscriber interface unit through the single switch port.

29. An ATM interactive video entertainment network as recited in claim 28 wherein the switch port is configured to send registration acknowledgment messages to the ATM subscriber interface units notifying them of their ranges of virtual channel numbers, the registration acknowledgment messages including the user parts of the ATM subscriber interface units' ATM addresses.

30. An ATM interactive video entertainment network as recited in claim 28 wherein an individual registration request message comprises a single ATM cell.

31. An ATM interactive video entertainment network as recited in claim 28 wherein an individual registration request message comprises a plurality of ATM cells each containing the user part of the ATM subscriber interface unit sending said individual registration request message.

32. An ATM interactive video entertainment network as recited in claim 28 wherein the single switch port is for downstream communications with the plurality of subscriber interface units, the node switch comprising another switch port for upstream communications with the plurality of subscriber interface units, the ATM node switch having an address table for each of the switch ports.

33. An ATM interactive video entertainment network as recited in claim 28 wherein the virtual channel numbers comprise virtual path identifiers and virtual channel identifiers.

34. An ATM interactive video entertainment network comprising:

a plurality of ATM subscriber interface units in individual neighborhood homes;

a neighborhood node;

a coax distribution plant providing a plurality of communication channels between the ATM subscriber interface units and the neighborhood node;

a cable headend;

an ATM node switch associated with the cable headend, the ATM node switch having at least a single switch port;

a trunk providing the plurality of communication channels between the ATM node switch and the neighborhood node;

a data modulator between the switch port and the trunk to transmit modulated data on a selected channel from the ATM node switch to the neighborhood node and then through the coax distribution plant to individual ATM subscriber interface units, wherein a plural group of the ATM subscriber interface units are tuned to the selected channel to receive ATM cells from the cable headend;

the ATM node switch being configured to assign exclusive ranges of virtual channel numbers to the individual ATM subscriber interface units of the plurality of ATM subscriber interface units to be used in ATM data cells transferred from the ATM node switch to the individual ATM subscriber interface units;

an individual ATM subscriber interface unit being configured to accept only those ATM data cells having virtual channel numbers within the range of virtual channel numbers assigned to the individual ATM subscriber interface unit.

35. An ATM interactive video entertainment network as recited in claim 34 wherein the subscriber interface units are configured to send registration request messages to the ATM node switch, the registration request messages including user parts of ATM addresses indicating which of the plurality of ATM subscriber interface units individual registration request messages are from.

36. An ATM interactive video entertainment network as recited in claim 34 wherein the ATM node switch is configured to send registration acknowledgment messages to the ATM subscriber interface units notifying them of their ranges of virtual channel numbers, the registration acknowledgment messages including the user parts of the ATM subscriber interface units' ATM addresses.

* * * * *